Dec. 28, 1965   J. G. SCHABERG ETAL   3,225,607
GYROSCOPE
Filed Nov. 13, 1961   2 Sheets-Sheet 1
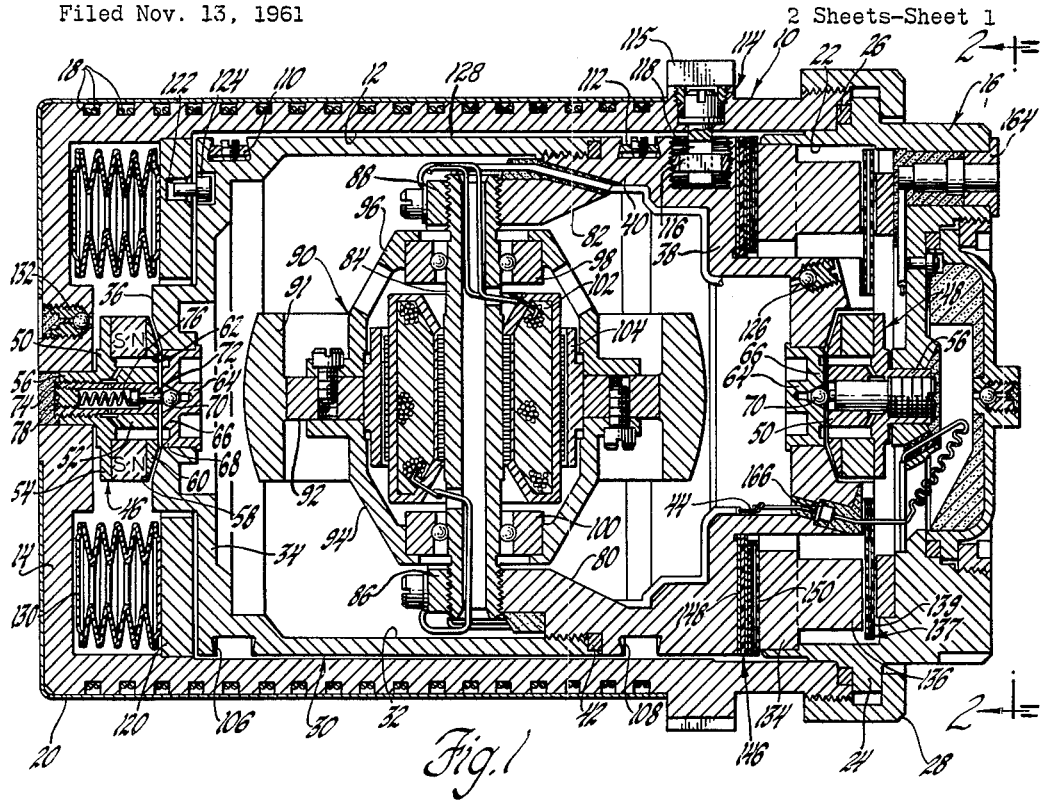
Fig. 1
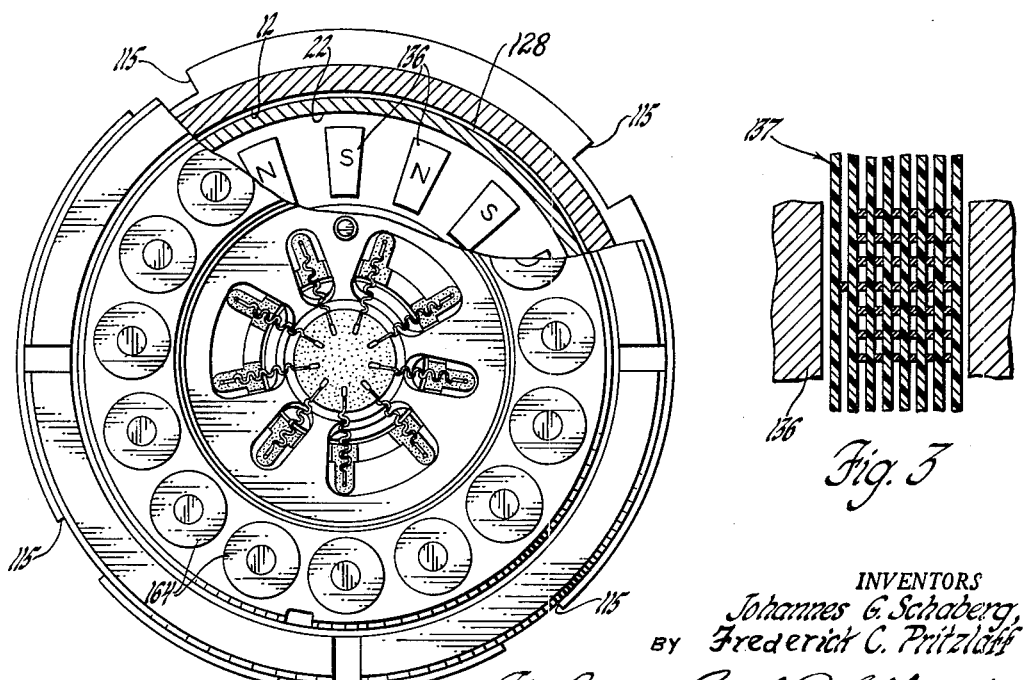
Fig. 2
Fig. 3
INVENTORS
Johannes G. Schaberg,
Frederick C. Pritzlaff
BY
Paul J. Ethington
ATTORNEY Dec. 28, 1965  J. G. SCHABERG ETAL  3,225,607
GYROSCOPE Filed Nov. 13, 1961  2 Sheets-Sheet 2

INVENTORS
Johannes G. Schaberg,
BY Frederick C. Pritzlaff

Paul J. Ethington
ATTORNEY 3,225,607
GYROSCOPE
Johannes G. Schaberg, New Berlin, and Frederick C. Pritzlaff, Milwaukee, Wis., assignors to General Motors Corporation, Detroit, Mich., a corporation of Delaware
Filed Nov. 13, 1961, Ser. No. 151,643
6 Claims. (Cl. 74—5)

This invention relates to gyroscopic instruments and more particularly to integrating gyroscopes of the floated type.

In accordance with this invention there is provided a gyroscope of exceedingly small size and weight but with a very high degree of stability. This is accomplished by providing a very high angular momentum and by reducing the uncertainty torques such as those arising from unwanted coupling between the gyroscope casing and gimbal. An important feature of the invention, for eliminating uncertainty torques, is a magnetic suspension combined with a non-magnetic gimbal to permit gimbal rotation about the output axis with angular constraints of predetermined and reproducible values. In the magnetic suspension a disk-shaped magnet with central and annular poles of opposite polarity are mounted on the casing opposite an armature of similar configuration which is mounted directly on the non-magnetic gimbal and thus a high degree of radial stiffness is achieved with a minimum of space requirement. This construction results in a minimum of loading on the gimbal by the armature of the magnetic suspension and also permits a uniformly distributed magnetic field so that undesired and unpredictable torques are reduced to a negligible value. To permit measurement of the angular displacement of the gimbal without adding appreciable load to the gimbal and without producing undesired torques, an inductively coupled signal generator having a rotor winding with a non-magnetic core is provided on the gimbal. Both the rotor and stator winding may be disposed in a thin disk core so that the space and weight requirements are minimized. In order to exert accurately controlled torques on the gimbal, a permanent magnet field member is mounted on the casing and an armature winding, disposed in a non-magnetic core, is mounted on the gimbal and thus loading and undesired torques on the gimbal are held to a minimum. An additional feature, which permits initial balancing of the gimbal and prevents mass shift unbalances about the output axis, is the provision of a threaded spin motor shaft clamped in split nuts. By this construction, balance may be effected by rotation of the shaft within the split nuts and clamping, without subjecting the shaft to tensile stresses; furthermore, heat dissipation from the spin motor to the gimbal is enhanced by the threaded engagement so that thermal gradients are of small value.

A more complete understanding of this invention may be had from the detailed description which follows taken with the accompanying drawings in which:

FIGURE 1 is a sectional view taken through the output axis of the inventive gyroscope;

FIGURE 2 is a view taken on lines 2—2 of FIGURE 1 with parts cut away;

FIGURE 3 shows a detail of the torque motor;

Figure 4:
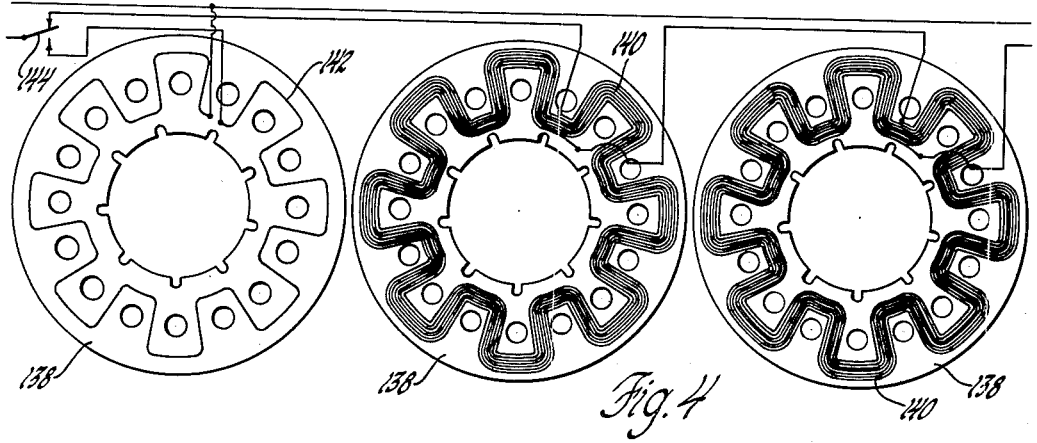
FIGURE 4 illustrates the torque motor armature.

Referring now to the drawings, there is shown an illustrative embodiment of the invention in a single degree of freedom, intergrating gyroscope of the floated type.

In general, the gyroscope comprises a casing 10 within which is disposed a cylindrical gimbal 30 supported for rotation about an output axis by a pair of magnetic suspension devices 46 and 48. A gyroscope wheel 90 is mounted for rotation within the gimbal about a spin reference axis and is driven by an electric motor. The input axis of the gyroscope is, of course, mutually perpendicular to the spin reference axis and the output axis. An angular displacement signal generator 146 is provided to develop a signal voltage corresponding to the angular displacement of the gimbal with respect to the casing 10 and a torque motor 137 is provided to impress compensating or control torques upon the gimbal about the output axis.

Considering the gyroscope in greater detail, the casing 10, suitably constructed of beryllium, is of cylindrical configuration and defines a cylindrical chamber 12 closed at one end by an integral cover plate 14 and at the other end by a removable cover plate 16. To maintain the gyroscope at an operating temperature within a prescribed range, the casing 10 carries a resistance heating element 18 which is wound upon the casing in a continuous circumferential slot and which is adapted for connection with a suitable voltage source. The energization of the resistance element is controlled in a conventional manner by a thermostatic device, not shown, and the heater element is enclosed by a metallic sheath 20 fitted over the casing. The removable cover 16 is formed with a cylindrical flange 22 which extends within the cylindrical chamber 12 of the casing and is formed with an annular shoulder 24 which abuts the end of the casing. A hermetic seal 26 is disposed between the shoulder 24 and the end of the casing 10 and compressed by a flanged nut 28 seated on the shoulder 24 and making screw thread engagement with the end of the casing 10.

The gimbal 30 has a cylindrical external surface and is disposed within the casing 10. The gimbal is constructed of a non-magnetic material, such as beryllium or aluminum, and defines a gimbal chamber 32 which is closed at one end by an integral end plate 34 with a hub 36 disposed coaxially of the gimbal. The gimbal is closed at the other end by a removable end plate 38 which is formed with a cylindrical flange 40 threaded within the open end of the cylindrical portion of the gimbal and hermetically sealed by a gasket 42. The removable end plate is formed with an integral hub 44 coaxially of the gimbal.

The gimbal is mounted for rotation about the output axis by the pair of magnetic suspension devices 46 and 48. Both of the magnetic suspension devices are of the same construction and the same reference characters will be applied to the corresponding parts thereof. Each device comprises a magnet or field producing member including a soft iron core 50 formed with an annular central pole 52, annular flange 54 and a mounting stud 56. An annular permanent magnet 58 is axially polarized, as indicated, around its entire circumference, is mounted upon the annular flange 54 and surrounds the central pole 52 in radially spaced relation. A soft iron annular pole piece 60 is mounted upon the permanent magnet 58 and is formed with a bevelled outer shoulder which terminates in a narrow annular pole tip 62. Each suspension device also includes an armature 64 having an annular central pole 66 and an outer annular pole 68 adapted for alignment with the central pole 52 and annular pole tip 62, respectively, of the field member. The armatures 64 are constructed of magnetic material having a high permeability and high saturation flux density such as solid or powdered soft iron which exhibits a low value of retentivity. The permanent magnet field member of the suspension device 46 is mounted in the cover plate 14 of the casing by cementing the mounting stud 56 in the central opening of the cover plate. Similarly, the permanent magnet field member of the suspension device 48 is mounted in the removable cover plate 16 by the mounting stud 56 in a central opening in the cover plate. The armatures 64 of the suspension devices 46 and 48 are mounted, by cement, in central openings in the hubs 36 and 44, respectively.

In order to limit the end-play of the gimbal in the magnetic suspension, each suspension device is provided with a thrust mechanism which offers substantially no frictional constraint to radial or angular displacement of the gimbal. Each thrust mechanism comprises an abutment in the form of a hardened steel ball 70 seated in a conical recess in the central pole piece 66 of the armature. A stop pin 72 is slidably disposed in an adjustable sleeve 74 which extends through the mounting stud 56 and central pole 52 of the field member. The stop pin has a flat jewel tip which is urged toward engagement with the ball 70 by a spring 76 which is compressed by a set screw 78 in the sleeve. This arrangement permits the spring loading on the stop pin to be adjusted by the set screw 78 and the axial position of the stop pin may be adjusted by the threaded engagement of the sleeve with the mounting stud. The set screw 78 and sleeve 74 of each suspension device are accessible during assembly from the exterior of the casing and the end-play of the gimbal is adjusted to a very minute dimension, such as a few hundred-thousandths of an inch.

The magnetic suspension devices afford radial support for the gimbal and permit rotation thereof with substantially no frictional constraint or reaction torque. The magnetic circuit for each suspension device extends from the north pole of the permanent magnet through the annular pole tip 62 and across the air gap to the annular pole tip 68 on the armature and thence through the central pole 66 of the armature and across the air gap to the central pole 52 of the field member and through the annular flange 54 to the south pole of the permanent magnet. This arrangement of the central and outer annular poles causes a high flux density at the pole tips and any radial displacement of the gimbal is resisted by a high permeance gradient in the magnetic circuit and thus a high degree of radial stiffness in the suspension is achieved. The use of a high permeability armature on the gimbal rather than a second permanent magnet affords the greatest "payload" on the gimbal for a given suspension stiffness because the armature may be of small dimensions and operated at a high flux density without reaching the saturation region. Additionally, the soft iron lends itself much better to heat treatment than does permanent magnet material to minimize the angular inhomogeneities in the magnetic field which would tend to cause a preferential angular orientation of the suspension device and hence the gimbal.

In order to support the gyroscope wheel 90 and the spin motor within the gimbal 30, the removable end plate 38 is provided with a gimbal fork including a pair of integral arms 80 and 82 extending in the axial direction of the gimbal. A shaft 84 extends between the arms 80 and 82 and is threaded at both ends for engagement with split nuts 86 and 88, respectively, having threads coacting with threaded ends of the shaft. The split nuts are provided with screw threaded fasteners for clamping the ends of the shaft between the two parts of the nuts. The gyroscope wheel 90 includes a heavy rim 91 having a diameter which is only slightly less than the inside diameter of the gimbal 30 to obtain a maximum moment of inertia. The rim 91 is mounted upon a flange 92 which in turn is supported by a pair of cup shaped hubs 94 and 96 which are rotatably mounted upon the shaft by a pair of ball bearings 98 and 100, respectively. The ball bearings each have inner races formed integrally on the shaft and separate outer races, press fitted within the hubs, are preloaded to a predetermined design value by seating the radial flanges of the hubs against the wheel flange 92 by means of screw threaded fasteners.

The spin motor comprises an internal stator 102 non-rotatably mounted upon the shaft 84 and an external rotor 104 mounted in a central opening in the wheel flange 92. The motor is preferably a hysteresis synchronous motor with a polyphase winding and is adapted to rotate the gyroscope wheel at high speed to obtain a very high angular momentum. To provide for energization of the motor, the shaft 84 is hollow and the motor lead wires extend from the stator through the shaft and along the inside wall of the gimbal to the hub 38.

This construction of the gimbal, spin motor and gyroscope wheel permits a major balance adjustment to be made prior to assembly of the removable end plate 38 with the remaining portion of the cylindrical gimbal 30. The spin motor and gyroscope wheel may be axially shifted between the arms 80 and 82 of the gimbal fork by loosening the spit nuts 86 and 88 and rotating the shaft 84 in either direction. Since the shaft is held in the adjusted position by clamping the split nuts the shaft is not subjected to any tensile loading and consequently there are no axial stresses which would, in conjunction with temperature changes incident to operation of the gyroscope, tend to produce a mass shift transversely of the output axis and introduce a drift error in the gyroscope. Furthermore, the screw thread mounting of the shaft 84 in the gimbal fork arms increases the thermal conductivity between the shaft and the arm so that the heat generated by the spin motor is readily dissipated through the gimbal. To permit additional balance adjustment of the gimbal after it is assembled, there are provided a pair of undercut circumferential slots 106 and 108 at opposite ends of the gimbal with slidable weights 110 and 112, each of which is clamped in position by a set screw. Balance adjustment after the gimbal and associated equipment are assembled in the casing 10 is provided by four balance mechanisms 114 which are disposed in equally spaced relation in axially extending slots 115 in the casing 10. Each of these balance mechanisms includes a radially positioned weight 116 disposed in a radially extending opening in the gimbal and in screw threaded engagement therewith. The weights 116 are rotatable by shaft 118 having a head at the outer end and a forked inner end straddling the weight 116 in a lost motion in connection. Thus the weight may be rotated any desired number of turns in either direction and once the desired position is attained, the shaft 118 may be backed off a fraction of a turn to disengage the weight and avoid interference with angular displacement of the gimbal. To limit the angular displacement of the gimbal about the output axis of the gyroscope, a positive stop is provided between the gimbal and the casing. An annular plate 120 is mounted within the casing on an internal shoulder thereof and is provided with a circular opening 122 opposite a similar opening in the end plate of the gimbal. A stop pin 124 has a headed portion disposed within the gimbal and a shank portion of reduced diameter extending into the opening 122 in the plate 120.

The gimbal chamber is hermetically sealed and filled with an inert gas, suitably helium, at a desired pressure and to permit evacuation and gas filling the hub 44 is provided with a small passage which is closed at a conical seat by a ball seal 126 seated by a set screw. The gimbal 30 is floated in substantially neutral buoyancy by a viscous flotation liquid filling the space 128 between the inner wall of the casing 10 and the gimbal. The liquid in space 128 also provides viscous damping for the gimbal and the degree of damping determines the scale factor, or ratio of input to output angular rate, of the gyroscope. By use of a flotation liquid having a very high density and having a viscosity which is variable independently of the density, such as "fluorolube," which is available from the Fluoro-Chem Corporation, only a small displacement volume is required to float the gimbal and the scale factor of the gyroscope may be changed by changing liquids. In order to permit expansion of the liquid with temperature change, a sylphon bellows 130 of annular configuration is disposed between the annular plate 120 and the integral end plate 14 of the casing. The casing is also hermetically sealed and to permit filling of the casing with the flotation liquid the cover plate 14 is provided with a small passage which is closed at a conical seat by a ball seal 132 seated by a set screw.

The torque motor 137 is provided to exert torques on the gimbal about the output axis for the purpose of providing compensation or controlled precession. The torque motor comprises a permanent magnet stator with an annular field frame 134 and multiple poles 136 integral with the frame and extending axially of the gimbal. The poles of the stator are of alternate north and south polarity as indicated in FIGURE 2. The field frame 134 is supported in the removable cover plate 16 by cementing in the annular flange 22. The torque motor includes a rotor 139 which is mounted upon the hub 44 of the gimbal. As illustrated in FIGURES 3 and 4, the rotor includes a plurality of annular, non-magnetic, insulating disks 138 suitably formed of an epoxy resin in a laminated assembly. Each disk carries a series wound multiple pole winding with the same number of poles of alternate polarity as the permanent magnet stator. The conductors of the winding are suitably formed by a printed circuit technique. In the illustrative embodiment, the rotor comprises seven disks 138, six of which have multiple turn windings 140 of six conductors on each pole and one of the disks is provided with a single turn winding 142. The windings of the six multiple turn coils are connected in series by means of conductive pins through the disks to provide a single pair of input terminals for energization. The lamination with the single turn winding is provided with separate input terminals and a selector switch 144 is provided to permit selective energization of the single turn winding or the multiple turn winding in series. By this arrangement, a very precise control of precession rates of substantially different values can be obtained without the need of precise amplitude control of energizing current for the torque motor. When the selector switch connects the multiple turn windings with the voltage source a relatively high torque is exerted upon the gimbal and a high rate of precession is achieved. When the selector switch connects the single turn winding for energization to the same voltage source a very low precession rate is achieved. Since the rotor of the torque motor has a non-magnetic core, it is of exceedingly light weight and thus imposes very slight load upon the gimbal. Furthermore, the absence of magnetic material minimizes any undesired reaction torques on the gimbal. Because of the pole configuration of the torque motor, a limited degree of cocking or de-centering of the gimbal, as may be permitted by the magnetic suspension devices, will not cause any appreciable change in the torque characteristics of the motor.

Figure 5:
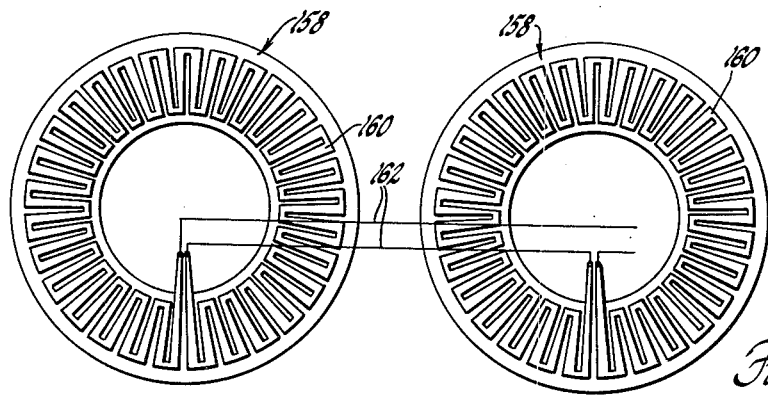
FIGURE 5 illustrates the displacement signal generator stator.
Figure 6:
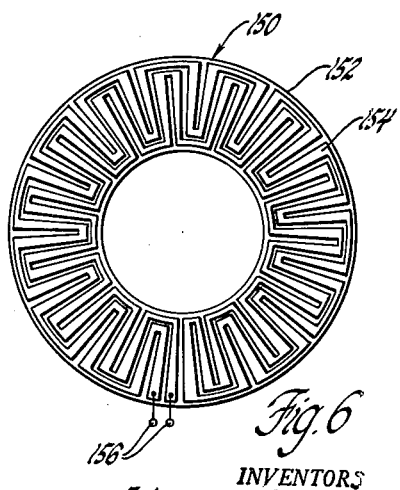
FIGURE 6 illustrates the rotor of the signal generator.

In order to provide an output signal corresponding to the angular displacement of the gimbal, there is provided a displacement signal generator 146, as illustrated in the assembly of FIGURE 1. The signal generator is of the reactance type and utilizes the variable induction between the rotor 148 and stator 150 as the measure of angular displacement. The stator 150, as illustrated in FIGURE 6, comprises a thin annular disk 152 of non-magnetic material, such as glass, which carries on one surface thereof a multiple pole winding 154 formed of a printed circuit bifilar conductor. The stator winding is adapted for connection with an alternating voltage source by a pair of terminals 156 and the excitation current produces alternate north and south poles equally spaced around the circumference of the stator. The stator is mounted by an adhesive cement on the back of the field frame 134 of the torque motor. The rotor 148 comprises a plurality of annular disks 158 each of which carries a multiple pole secondary winding 160 suitably formed on the face of the disk as a printed circuit. The disks 158 are assembled in a laminated construction and the rotor is mounted upon the removable end plate 38 of the gimbal opposite the stator 150 with a very small axial air gap therebetween to provide good inductive coupling between the excitation and secondary windings. The secondary windings 160 are connected in series with each other by conductive pins through the laminated assembly of the rotor, as indicated schematically by the conductors 162 in FIGURE 5, so that a desired turns ratio is achieved. It is to be noted that the secondary windings of the rotor have the same number of poles as the excitation windings of the stator and when the poles of the rotor are angularly displaced by 180 electrical degrees from the poles of the stator, a null or zero voltage is induced in the rotor. When the rotor is displaced in one direction toward alignment of the poles of the rotor and stator, a voltage is induced in the rotor winding which is of a phase and amplitude corresponding to the direction and extent of angular displacement. Similarly, when the rotor is displaced in the other direction, a voltage of the opposite phase is induced in the rotor windings. By this construction of the signal generator, a minimum of space is required and because of the absence of magnetic material in the inductive coupling the loading on the gimbal is held to a minimum and, of course, no appreciable reaction torque is exerted by the signal generator on the gimbal.

Figure 7:
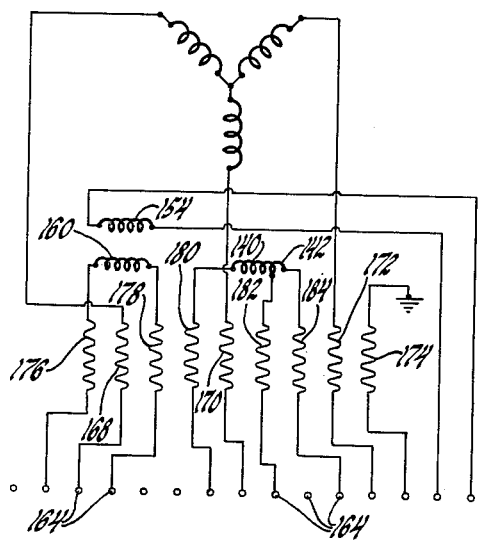
FIGURE 7 is a schematic diagram of the electrical connections of the gyroscope.

In order to supply energization to and derive signal voltages from the gyroscope, electrical terminals 164 are provided in the removable cover 16 of the gyroscope casing. Each terminal is adapted to receive an external connector and is electrically connected as indicated in the schematic diagram of FIGURE 7. The spin motor windings 102 are connected in a three phase, Y-connection and the terminals thereof are connected through hermetically sealed lead-wires 166 in the hub 44 of the gimbal and thence through flexible leads 168, 170 and 172 to separate terminals 164. A ground connection extends to the gyroscope gimbal in a similar fashion through the flexible lead 174 from a terminal 164. The rotor windings 160 of the signal generator are likewise connected through flexible leads 176 and 178 to a separate pair of terminals 164 and in a similar fashion, the torque motor winding 140 is connected through leads 180 and 182 to different terminals 164 and winding 142 is connected through leads 182 and 184 to terminals 164. The stator windings 154 of the signal generator are connected directly to a separate pair of terminals 164 since the stator is mounted on the gyroscope casing.

The gyroscope construction just described affords a high degree of stability even though it is of exceedingly small size and weight. In a particular design, the gyroscope may be approximately 2 inches in diameter, 3½ inches long with a total weight of 390 grams and with a maximum random drift rate of 0.01 degree per hour. This stability is achieved by reducing the uncertainty torques to a minimum and by reducing the effect of such torques on the drift rate by providing a very high angular momentum in the gyroscope wheel. A high value of angular momentum in the small gyroscope is obtained by an over-all design which permits a maximum "pay load" (i.e., the mass of the gyroscope wheel) on the gimbal with the wheel mass disposed at a maximum radius from the spin axis and rotated at high speed. In the particular gyroscope design referred to above, an angular momentum of $10^6$ gram centimeter$^2$ per second is achieved with the wheel rotating at 24,000 revolutions per minute.

The uncertainty torques about the axis of the gyroscope are minimized by correlating the gimball structure and suspension with the design of the displacement signal generator and the torque motor. The magnetic suspension devices 46 and 48 permit angular displacement of the gimbal 30 about the gyroscope output axis without restraining torques as are encountered with conventional bearings. Because of the disk-shaped construction of the magnet or field member and armature and the mounting thereof directly upon the gimbal and casing, respectively, requires only a small space and since the gimbal is of non-magnetic material there is no disturbance of the magnetic field of the suspension devices. This suspension provides a high degree of radial stiffness by virtue of the coaxial annular poles and since an armature of high permeability is used, the loading on the gimbal by the suspension device is small. Because of the absence of permanent magnet or high coericivity material on the gimbal, uniformity in the magnetic field is obtained and hence the tendency toward preferential orientation, which would contribute to uncertainty torques, is minimized.

The displacement signal generator with magnetic coupling of the stator and rotor contributes negligible uncertainty torques because the rotor winding mounted on the gimbal is disposed in a non-magnetic core. Since the gimbal itself is also non-magnetic, the magnetic field from the excitation winding on the stator exerts negligible torque on the gimbal. This construction also imposes only a small loading on the gimbal and furthermore the disk-shaped rotor and stator occupy very little space and permit small casing dimensions.

The torque motor using a permanent magnet field with constant field flux and an armature winding with a selectable number of turns permits precise torque control with a constant value of current. Since the armature winding is disposed on a non-magnetic core and mounted on the non-magnetic gimbal, no unwanted torques are developed and the armature is of light weight.

Within the gimbal, the gyroscope wheel and motor assembly are constructed to minimize mass unbalance about the output axis. Balance adjustment prior to assembly is provided by the threaded shaft 84 and split nuts 86 and 88 which permit the gyroscope wheel to be positioned by rotation of the shaft. Final balance after assembly is provided by circumerentially positioned weights 110 and radially positioned weights 116. Mass shift along the spin axis during operation is reduced by making the motor and wheel assembly symmetrical about a plane through the center of the wheel and by appropriate choice of parameters for the bearings and other elements along the spin axis, the assembly may be made isoelastic. Additional reduction of mass shift along the spin axis is achieved by the absence of tensile stresses in the shaft 84 and elimination of high temperature gradients which would cause differential expansion. These advantages are derived from the use of the threaded shaft and split nuts since the clamping forces on the shaft are radially directed and the increased thermal conductivity resulting from the larger contact area of the threaded engagement facilitates heat transfer from the spin motor to the gimbal.

Although the description of this invention has been illustrated in its preferred embodiment, it will be clear to those skilled in the art that many modifications and changes may be made without departing from the scope of the invention.

We claim:

1. A gyroscope comprising a closed casing defining a cylindrical chamber, a cylindrical gimbal of non-magnetic material disposed within the chamber and having a hub portion on each end, said gimbal being mounted for rotation about an output axis extending longitudinally thereof by a pair of magnetic suspension devices, each suspension device including a disk-shaped magnet with a central pole of one polarity and a coaxial annular pole of the other polarity, each suspension device also including a disk-shaped armature with a central pole and a coaxial annular pole adapted for alignment with corresponding poles of said magnet, the magnets being mounted on opposite ends of the casing in coaxial relation with said cylindrical chamber, the armatures being mounted on respective hub portions in engagement therewith and coaxially of the gimbal in axially spaced relation with the respective magnets whereby the gimbal is restrained against radial displacement by the magnetic field of said magnets, thrust means coacting between the gimbal and casing for limiting the axial displacement of the gimbal, a viscous liquid filling the space between the gimbal and the casing and supporting the gimbal in substantially neutral buoyancy, gyroscopic means disposed within said gimbal and defining a gyroscope input axis extending transversely of said output axis, and a signal generator including a magnetic field producing member on said casing and a magnetic field responsive member on said gimbal adapted to develop an output signal corresponding to displacement of the gimbal about said output axis.

2. A gyroscope comprising a closed casing defining a cylindrical chamber, a hollow cylindrical gimbal of non-magnetic material disposed within the chamber and having a hub extending from each end, said gimbal being mounted for rotation about an output axis extending longitudinally thereof by a pair of magnetic suspension devices each including a disk-shaped magnet with a central pole of one polarity and a coaxial annular pole of the other polarity and including a disk-shaped armature with a central pole and a coaxial annular pole adapted for alignment with the corresponding poles of the magnet, the magnets being mounted on opposite ends of the casing in coaxial relation therewith, the armatures being mounted on the hubs of the gimbal coaxially thereof and opposite the respective magnets whereby the gimbal is restrained against radial displacement, thrust means supported by the casing and coacting with the gimbal to limit the axial displacement of the gimbal, a viscous liquid filling the space between the gimbal and the casing and supporting the gimbal in substantially neutral buoyancy, a gyroscope wheel disposed in said gimbal and mounted for rotation about a spin axis extending transversely of the output axis, a torque motor including a permanent magnet stator mounted on the casing adjacent one end thereof and torque motor rotor windings disposed on a non-magnetic core mounted on the gimbal adjacent the permanent magnet stator, an angular displacement signal generator including a magnetic field producing member supported by said casing and a magnetic field responsive member with a non-magnetic core mounted on said gimbal adjacent the magnetic field producing member.

3. A gyroscope comprising a closed casing defining a cylindrical chamber and including a removable cover at one end, a hollow cylindrical gimbal of non-magnetic material disposed within the chamber and being closed by an inner end plate and by an outer end plate adjacent the removable cover, said gimbal being mounted upon the casing for rotation about an output axis by first and second magnetic suspension devices disposed respectively between the inner and outer end plates and the opposite ends of said casing, a pair of oppositely disposed support arms on the outer end plate and extending into the gimbal, a rotor shaft within the gimbal opening and extending transversely of said axis and being supported at opposite ends by threaded engagement with the support arms, a gyroscope motor including a rotor mounted for rotation on the shaft and a stator non-rotatably mounted on the shaft, the threads of the threaded engagement being of the same hand whereby the shaft and motor may be shifted axially in the gimbal by rotation of the shaft, an angular displacement signal generator including a first annular reactance member mounted on said outer end plate coaxially of the gimbal, and a second annular reactance member supported by said removable cover opposite the first reactance member and reactively coupled therewith, said removable cover and magnetic suspension devices permitting removal of the gimbal from said one end of the casing, and said outer end plate and gyroscope motor being removable as a unit from the gimbal chamber.

4. A gyroscope comprising a closed casing defining a cylindrical chamber and including a removable cover at one end, a hollow cylindrical gimbal of non-magnetic material disposed within the chamber and including an inner end plate and an outer end plate adjacent the removable cover, said gimbal being mounted upon the casing for rotation about an output axis by first and second magnetic suspension devices disposed respectively between the inner and outer end plates and the opposite ends of said casing, each suspension device including a disk-shaped magnet with a central pole of one polarity and a coaxial annular pole of the other polarity, each suspension device also including a disk-shaped armature with a central pole and a coaxial annular pole adapted for alignment with corresponding poles of said magnet, the magnets being mounted on opposite ends of the casing in coaxial relation with said cylindrical chamber, the armatures being mounted coaxially of the gimbal in axially spaced relation with the respective magnets whereby the gimbal is restrained against radial displacement by the magnetic field of said magnets, thrust means coacting between the gimbal and casing for limiting the axial displacement of the gimbal, a pair of oppositely disposed support arms on the outer end plate and extending into the gimbal, a rotor shaft within the gimbal opening and extending transversely of said axis and being supported at opposite ends by the support arms, a gyroscope motor including a rotor mounted for rotation on the shaft and a stator non-rotatably mounted on the shaft, an angular displacement signal generator including a first annular reactance member disposed upon a non-magnetic core and supported by said outer end plate coaxially of the gimbal, and a second annular reactance member supported by said removable cover opposite the first reactance member and reactively coupled therewith, said removable cover and magnetic suspension devices permitting removal of the gimbal from said one end of the casing, and said outer end plate and gyroscope motor being removable as a unit from the gimbal chamber.

5. A gyroscope comprising a closed casing defining a cylindrical chamber and including a removable cover at one end, a hollow cylindrical gimbal of non-magnetic material disposed within the chamber and including an inner end plate and an outer end plate adjacent the removable cover, said gimbal being mounted upon the casing for rotation about an output axis by first and second magnetic suspension devices disposed respectively between the inner and outer end plates and the opposite ends of said casing, each suspension device including a disk-shaped magnet with a central pole of one polarity and a coaxial annular pole of the other polarity, each suspension device also including a disk-shaped armature with a central pole and a coaxial annular pole adapted for alignment with corresponding poles of said magnet, the magnets being mounted on opposite ends of the casing in coaxial relation with said cylindrical chamber, the armatures being mounted coaxially of the gimbal in axially spaced relation with the respective magnets whereby the gimbal is restrained against radial displacement by the magnetic field of said magnets, thrust means coacting between the gimbal and casing for limiting the axial displacement of the gimbal, a pair of oppositely disposed support arms on the outer end plate and extending into the gimbal, a rotor shaft within the gimbal and extending transversely of said axis and being supported at opposite ends by the support arms, a gyroscope motor including a rotor mounted for rotation on the shaft and a stator non-rotatably mounted on the shaft, a torque motor comprising a permanent magnet field member mounted upon said removable cover and a rotor with windings disposed in a non-magnetic core mounted upon the gimbal, an angular displacement signal generator including a first inductive winding disposed upon a non-magnetic core and supported by said outer end plate coaxially of the gimbal, and a second inductive winding supported by said removable cover opposite the first winding and inductively coupled therewith, said removable cover and magnetic suspension devices permitting removal of the gimbal from said one end of the casing, and said outer end plate and gyroscope motor being removable as a unit from the gimbal chamber.

6. A gyroscope comprising a closed casing defining a cylindrical chamber and including a removable cover at one end, a hollow cylindrical gimbal of non-magnetic material disposed within the chamber and including an inner end plate and an outer end plate adjacent the removable cover, each of said end plates including a hub coaxial with the gimbal, said gimbal being mounted upon the casing for rotation about an output axis by first and second magnetic suspension devices disposed respectively between the hubs and the opposite ends of said casing, each suspension device including a disk-shaped magnet with a central pole of one polarity and a coaxial annular pole of the other polarity, each suspension device also including a disk-shaped armature with a central pole and a coaxial annular pole adapted for alignment with corresponding poles of said magnet, the magnets being mounted on opposite ends of the casing in coaxial relation with said cylindrical chamber, the armatures being mounted on respective hub portions in engagement therewith and coaxially of the gimbal in axially spaced relation with the respective magnets whereby the gimbal is restrained against radial displacement by the magnetic field of said magnets, thrust means coacting between the gimbal and casing for limiting the axial displacement of the gimbal, a pair of oppositely disposed support arms on the outer end plate and extending into the gimbal, a rotor shaft within the gimbal and extending transversely of said axis and being supported at opposite ends by the support arms, a gyroscope motor including a rotor mounted for rotation on the shaft and a stator non-rotatably mounted on the shaft, a torque motor including a permanent magnet field member mounted upon the removable cover with poles extending axially toward said removable cover, the motor also including a rotor with windings disposed in a non-magnetic core mounted upon the hub of the outer end plate between said poles and the removable cover, an angular displacement signal generator including a first inductive winding disposed on an annular non-magnetic core and mounted on said outer end plate coaxially of the gimbal, and a second inductive winding mounted upon the permanent magnet field member opposite the first winding and inductively coupled therewith, said removable cover and magnetic suspension devices permitting removal of the gimbal from said one end of the casing, and said outer end plate and gyroscope motor being removable as a unit from the gimbal chamber.

References Cited by the Examiner

UNITED STATES PATENTS

| | | | |
|---|---|---|---|
| 2,582,788 | 1/1952 | Mendelsohn | 74—5 X |
| 2,779,882 | 1/1957 | Ishikawa | 310—40 |
| 2,799,835 | 7/1957 | Tripp et al. | 336—123 |
| 2,809,526 | 10/1957 | Lundberg | 74—5 |
| 2,894,395 | 7/1959 | Soland | 74—5.6 |
| 2,964,950 | 12/1960 | Burgwin | 74—5 |
| 3,060,752 | 10/1962 | Johnson et al. | 74—5.6 |

FOREIGN PATENTS 1,110,741   7/1961   Germany.

BROUGHTON G. DURHAM, *Primary Examiner.*